US011313305B2

(12) United States Patent
Wright et al.

(10) Patent No.: US 11,313,305 B2
(45) Date of Patent: Apr. 26, 2022

(54) FUEL SYSTEM TEST APPARATUS AND METHOD

(71) Applicant: GE Global Sourcing LLC, Norwalk, CT (US)

(72) Inventors: David Wright, Decatur, TX (US); David Baldwin, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 239 days.

(21) Appl. No.: 16/512,049

(22) Filed: Jul. 15, 2019

(65) Prior Publication Data

US 2021/0017925 A1 Jan. 21, 2021

(51) Int. Cl.
| | | |
|---|---|---|
| G06F 1/00 | (2006.01) |
| F02D 41/22 | (2006.01) |
| F02M 65/00 | (2006.01) |
| B61L 27/00 | (2022.01) |
| G01M 17/08 | (2006.01) |
| G01M 3/26 | (2006.01) |
| B61C 5/00 | (2006.01) |

(52) U.S. Cl.
CPC .......... *F02D 41/22* (2013.01); *B61L 27/0094* (2013.01); *F02M 65/006* (2013.01); *G01M 3/26* (2013.01); *G01M 17/08* (2013.01); *B61C 5/00* (2013.01); *F02D 2041/225* (2013.01)

(58) Field of Classification Search
CPC ............... F02D 19/025; F02D 19/0623; F02D 2041/227; F02D 41/22; F02D 2041/224; F02D 19/0628; F02D 19/0631; F02D 41/3836; F02D 2200/0602; F02D 2250/31; F02M 65/00
USPC ............ 701/114; 73/114.38, 114.41, 114.42, 73/114.43
See application file for complete search history.

(56) References Cited

U.S. PATENT DOCUMENTS

| | | | |
|---|---|---|---|
| 8,246,840 B1* | 8/2012 | Blundy ................. | F02M 37/42 210/767 |
| 2014/0224220 A1* | 8/2014 | Moonjelly .......... | F02M 63/023 123/447 |
| 2015/0052980 A1* | 2/2015 | Sheldon ............... | G01M 3/025 73/40.5 R |
| 2015/0354510 A1* | 12/2015 | Dudar ................ | F02M 25/0818 73/40.7 |
| 2016/0341626 A1* | 11/2016 | Thakkar ................ | B60K 15/04 |
| 2017/0016794 A1* | 1/2017 | Dudar .................. | G01M 3/025 |
| 2017/0137022 A1* | 5/2017 | Dudar .................. | B60W 10/08 |
| 2019/0368431 A1* | 12/2019 | Dudar ................ | F02M 25/0818 |

* cited by examiner

*Primary Examiner* — John Kwon
(74) *Attorney, Agent, or Firm* — The Small Patent Law Group LLC; Mary D. Lawlor

(57) ABSTRACT

A method that includes coupling an external, removable fuel pressurization system to a fuel system of a vehicle while the vehicle remains in a confined space. The fuel system of the vehicle is pressurized with the fuel pressurization system while the vehicle remains in the confined space and without activating an engine of the vehicle. Decay of pressure of the fuel system is monitored following pressurization of the fuel system, and one or more of a leak, or a replaceable component, of the fuel system of the vehicle is detected based on at least in part on the decay of pressure that are monitored.

12 Claims, 4 Drawing Sheets

FUEL SYSTEM TEST APPARATUS AND METHOD

BACKGROUND

Technical Field

Embodiments of the specification relate to vehicle maintenance, and more particularly, to a removable fuel pressurization system and method of performing diagnostics.

Discussion of Art

Various fleets of vehicles have service requirements for their systems. For example, when a locomotive finishes with its route, the locomotive is taken to a motive power depot until its next use. At the depot, general maintenance may occur. This maintenance may include powering electric locomotives, fueling diesel locomotives, performing diagnostics, and repairing and replacing components. Still, diesel engines generally are not started inside the depot and must be moved outside to be started. Some diagnostics may only be performed with the locomotive and/or its engine either turned on (for some diagnostics) or off (for other diagnostics). As a result, often issues, including issues related to workmanship failures during scheduled and unscheduled maintenance, are undetected, resulting in operation inefficiencies and failures on the track.

One area that may sometimes need repair and/or testing is the pressurized fuel system of the locomotive engine. The pressurized fuel system may be disassembled and reassembled for maintenance checks, scheduled maintenance or repair, or the like during the time within the depot. Not until the locomotive is outside the depot and its engine is restarted can defects within the reassembled pressurized fuel system be detected, resulting in the locomotive requiring additional repair. It may be desirable to have a different diagnostic system and method than those that are currently available.

BRIEF DESCRIPTION

In accordance with one embodiment, a method is provided that includes coupling an external, removable fuel pressurization system to a fuel system of a vehicle while the vehicle remains in a confined space. The method also includes pressurizing the fuel system of the vehicle with the fuel pressurization system while the vehicle remains in the confined space and without activating an engine of the vehicle, monitoring decay of pressure of the fuel system following pressurization of the fuel system, and detecting one or more of a leak, or a replaceable component of the fuel system of the vehicle, based on at least in part on the decay of pressure that are monitored.

In accordance with another embodiment, a mobile fuel pressurization system is provided, and a pump engine. One or more fuel pumps are coupled with and powered by the pump engine. A controller is configured to communicate with one or more pressure sensors operably coupled with a fuel system of a vehicle. The diagnostic system is portable and is configured to be moved into a confined space where the vehicle is located, and the one or more fuel pumps on the mobile cart are configured to be fluidly coupled with the fuel system of the vehicle. The pump engine is configured to be activated to power the one or more fuel pumps to pressurize the fuel system of the vehicle while the vehicle remains in the confined space, and without activating an engine of the vehicle. The controller is configured to receive pressure measurements provided by the one or more pressure sensors to monitor decay of at least one pressure of the fuel system following pressurization of the fuel system, and the controller configured to detect one or more of a leak or a replaceable component of the fuel system of the vehicle based on the decay of pressure that are monitored.

In accordance with an embodiment, a method that includes coupling an external, mobile fuel pressurization system to a vehicle fuel system, and pressurizing the vehicle fuel system with one or more pumps powered by an engine of the mobile fuel pressurization system while an engine and a cooling system of a vehicle containing the vehicle fuel system remain deactivated. Additionally, pressures of the fuel system are measured from pressurization of the fuel system, and one or more determined aspects of the vehicle fuel system meet one or more designated criterion are detected based on a change in the pressures of the fuel system following pressurization of the fuel system.

BRIEF DESCRIPTION OF THE DRAWINGS

These and other features and aspects of embodiments of the specification are set forth in the following detailed description and may be read with reference to the accompanying drawings in which like characters represent like parts throughout the drawings, wherein.

DETAILED DESCRIPTION

Embodiments of the specification relate to vehicle maintenance, and particularly to a test apparatus for use with a fuel pressurization system and method of performing diagnostics. Embodiments discussed herein disclose systems and methods for diagnosing issues within a vehicle using a selectively removable system.

In one embodiment, the system can diagnose issues with the vehicle at enclosed locations, such as a repair shop, in a confined space that has restricted airflow without starting or turning on a source of motive power of the vehicle. The motive power otherwise may be required to start (e.g., turn on) to perform the diagnostic process (e.g., without the systems and methods described herein). Confined spaces that have areas with restricted airflow include structures that house vehicles, including train depots, garages, vehicle repair shops, parking facilities, or the like. In one embodiment, the systems and methods pressurize a fuel delivery system of a vehicle that is pressurized with a removable and/or mobile device, where the fuel delivery system is otherwise pressurized with pumps powered (directly and/or indirectly) by an engine or other source of motive power of the vehicle.

In one embodiment, a system includes at least one pump on a mobile device such as a cart that can deliver high-pressure fuel to the fuel system. The system also can optionally include one or more sensors to detect leaks, fuel decay, or the like within the fuel system so that repairs to the system, or replacement of components, may be diagnosed and addressed. Because the removable fuel pressurization system is mobile, the diagnosis may take place within a structure that houses a vehicle, including a train depot before the locomotive exits the depot. By making the diagnosis within the train depot, the locomotive does not have to be brought back into the depot for repair, avoiding undesired logistics, downtime, labor, costs, and the like.

Figure 1:
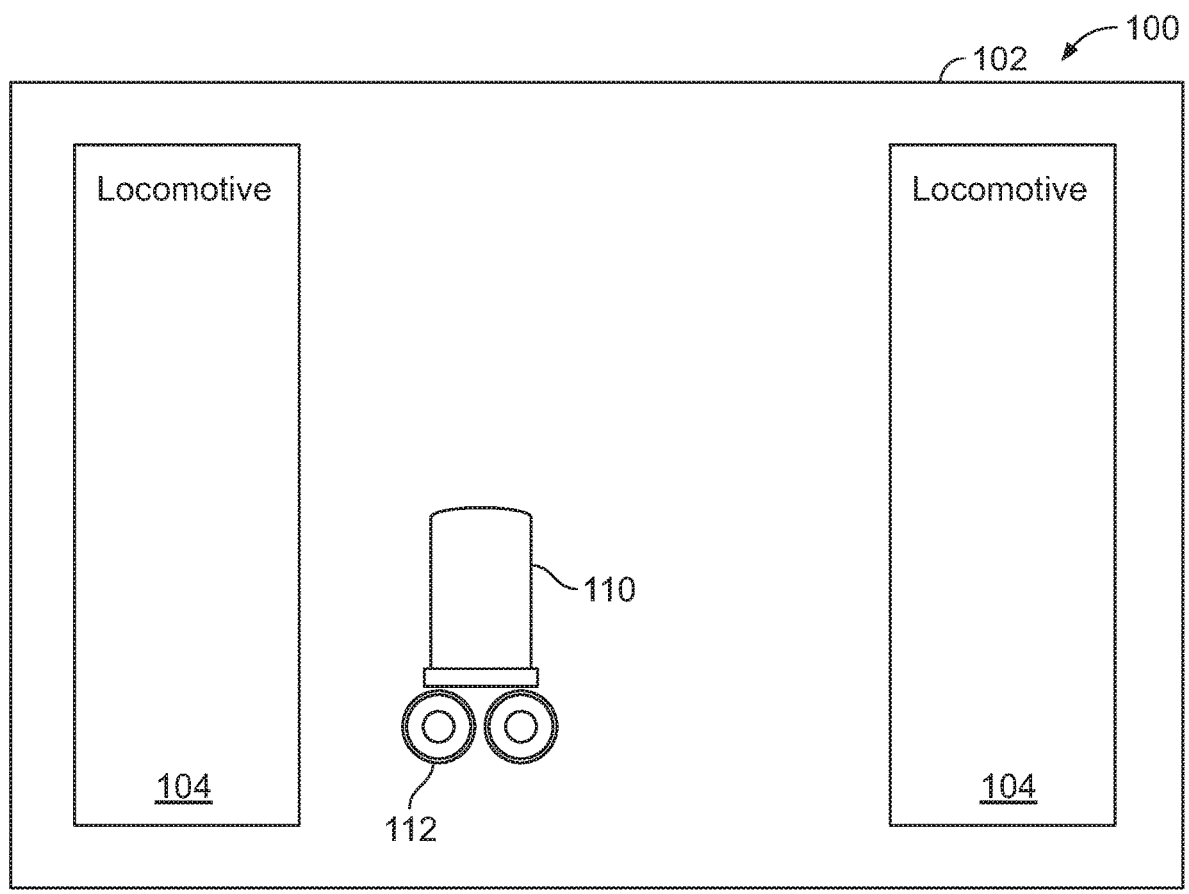
FIG. 1 illustrates one embodiment of a schematic view of a structure for housing at least one vehicle.

FIG. 1 shows a partial schematic diagram of a structure 102 that houses at least one vehicle 104. The structure may be any area that includes a confined space with a restricted airflow and houses at least one vehicle 104. Such confined spaces include train depots, garages, vehicle repair shops, parking facilities, or the like. Restricted airflow when used herein includes any area in which use on an engine would be unsafe for individuals in the area. As an example, with a closed garage, starting of a vehicle without adequate ventilation could result in carbon monoxide poisoning. Alternatively, in a train depot, the operation of an engine of a locomotive in a confined space without adequate ventilation may suffocate the workers therein. Both examples represent structures that include a restricted airflow and/or potentially insufficient ventilation. There may be other reasons for not operating large equipment indoors, such as sound volume, safety concerns, thermal considerations, and the like.

In FIG. 1, the structure 102 is a confined space 100 that is a motive train depot houses a plurality of vehicles 104, that are locomotives in this example, and that are housed for downtime and/or maintenance before and after traveling on a route. The motive train depot houses numerous locomotives, locomotive fuel, charging stations, maintenance equipment, and the like for repairing and maintaining the locomotives 104. In one embodiment a portable and removable fuel pressurization diagnostic system is provided for diagnostic testing of the high-pressure fuel system (FIG. 2) of one or more locomotives 104. When used herein, "high-pressure" refers to pressures of at least 1500 pounds per square inch (1500 psi). The fuel pressurization diagnostic system includes a cart 110. In one example the cart is mobile and includes at least one wheel 112 for transporting the system. In one example, the cart 110 includes four wheels. Alternatively, the mobile cart includes tracks, rollers or any other number of wheels. In this manner, an individual may push, pull, and/or carry the fuel pressurization diagnostic system to the locomotive that is to be tested. Motorizing the tracks or wheels allows for self-propulsion of the cart. Alternatively, the cart 110 is stationary, including in one example where the cart 110 is secured to, or built into, the structure 102.

Figure 2:
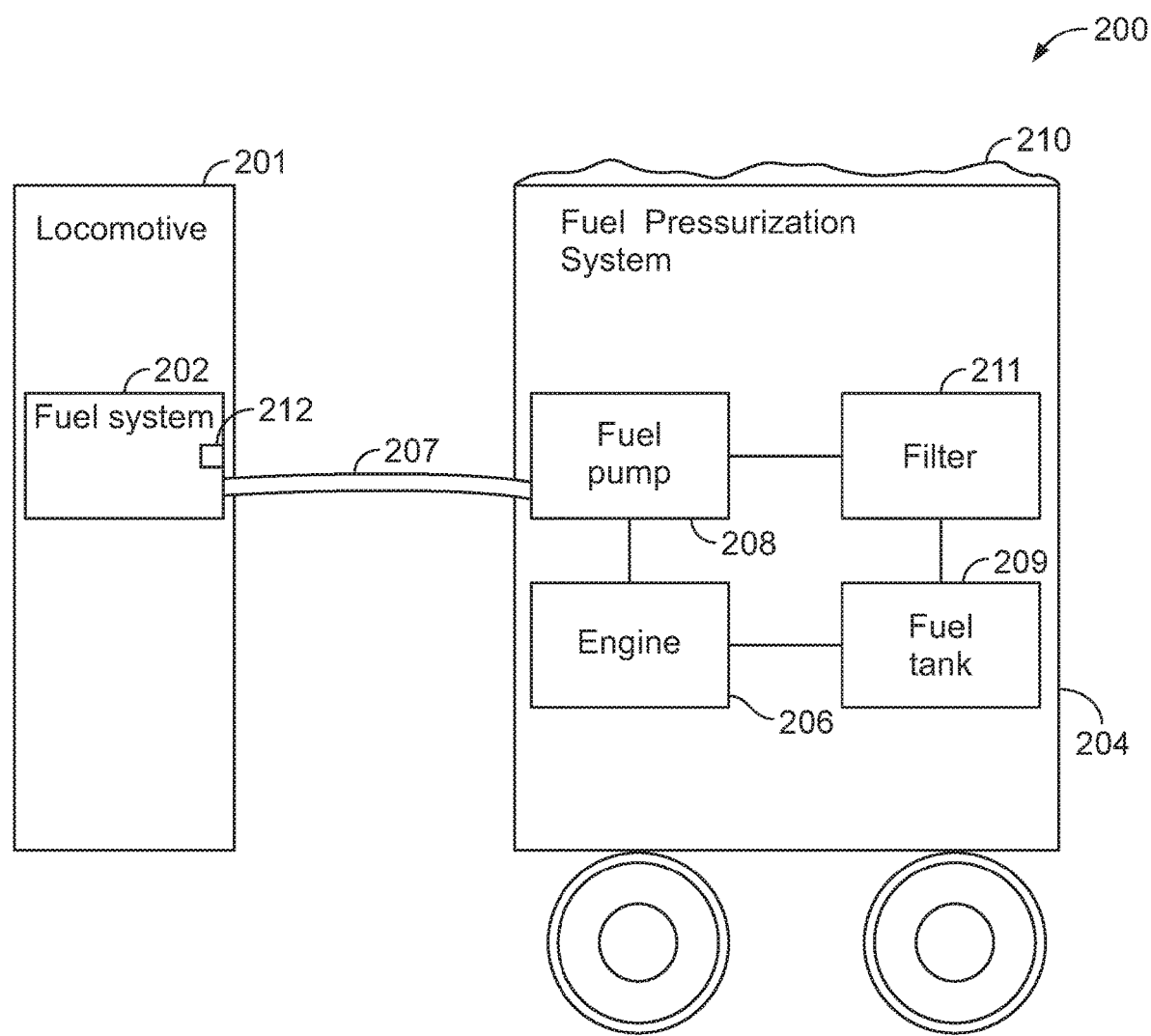
FIG. 2 illustrates a schematic view of one embodiment of a fuel pressurization system coupled to a fuel system.

FIG. 2 illustrates a schematic diagram of a fuel pressurization system 200 coupled to a high-pressure fuel system 202 of a locomotive 201. The fuel pressurization system 200 includes a cart 204 that receives an engine 206 mechanically coupled to at least one fuel pump 208 that is fluidly coupled to at least one fuel tank 209. Optionally, more than one fuel pump 208 may be provided.

In one example, the engine 206 is self-contained on the cart and is powered by a battery source. Alternatively, the engine has a power source that may include an internal combustion, an electric, wind or air powered, a hydraulic, or the like.

In one example, the fuel system of the vehicle is pressurized by fluidly coupling at least one fuel pump 208 to the high-pressure fuel system 202 via a fluid conduit 207. In another example, the fluid conduit is a high-pressure hose providing a fluid flow path between the fuel pressurization system 200 and high-pressure fuel system 202. The hose and/or the fluid flow path may include valving that control the flow and volume of fluid through the conduit 207. The fluid conduit 207 and valving may include check valves, pressure relief valves, or the like to avoid potentially dangerous pressure levels and to improve safety of the fuel pressurization system 200. The fuel pressurization system 200 may pressurize the fuel system of the vehicle to a full, or greater, working pressure.

In an example, the fuel pump 208 of the fuel pressurization system 200 is driven by the engine 206 of the fuel pressurization system 200 to deliver high-pressure fuel from a fuel tank 209 along the fluid flow path, through the conduit 207 to the high-pressure fuel system 202 to increase the volume of fuel within the high-pressure fuel system, and to increase the pressure within the high-pressure fuel system. To this end, fuel may be supplied from the fuel pressurization system 200 to the high-pressure fuel system based on a desired volume of fuel, based on a desired pressure within the fuel pressurization system 200, based on a combination of fuel volume and pressure within the fuel pressurization system 200, or the like. Optionally, the fuel pressurization system 200 includes at least one filter 211 to maintain required fuel cleanliness standards as required by the vehicle engine being tested. The filters, consequently, may prevent damage to the vehicle engine being tested that could result from differing fuel requirements for different engines.

In one example, the fuel pressurization system 200 is movable, including through use of a cart 110 as described in relation to FIG. 1, or the cart 204 as described in relation to FIG. 2. As a result of using a portable, or movable, fuel pressurization system 200, in an example embodiment when the vehicle being tested is a locomotive, the fuel pressurization system may be stored within a motive train depot and delivered to a locomotive that needs to be tested. The test may be performed by the fuel pressurization system 200 without having to turn on the locomotive or take the locomotive outside of the motive train depot. Because the locomotive engine does not have to be operating, the diagnostic test may be performed in an air-restricted area such as inside the depot where vehicles typically do not operate because of safety concerns, including carbon monoxide poisoning. Therefore, in the example embodiment where the vehicle is a locomotive, a diagnostic test may be performed on the fuel system before moving the locomotive outside of the motive train depot, preventing a train from breaking down as a result of not discovering the need for a repair after the locomotive has left the motive train depot.

In an example embodiment when the fuel pressurization system is portable and mobile and may include more than one fuel pump, more than one vehicle may be tested at one time. Alternatively, when one fuel pump 208 is not operable for any reason, the other fuel pump may be used. In another example, the cart 204 may include a retractable hood 210 that may shield the cart 204 from the environment. In this manner, the cart 204 may be taken outside of a structure, such as a depot, and used for diagnostic purposes if desired. Specifically, the hood 210 may protect the cart 204 from rain, sleet, hail, snow or the like to prevent damage to the fuel pressurization system 200 when used in an outdoor environment.

The fuel pressurization system optionally includes at least one sensor 212 for monitoring features of interest related to the high-pressure fuel system 202. In one example the sensor 212 is a pressure sensor that is coupled to an interior of the high-pressure fuel system 202 to monitor and detect changes in pressure within the high-pressure fuel system 202. In particular, while in one example a diagnostic test may be performed through observation, or manually, alternatively, a sensor reading similarly may monitor the fuel system. Alternatively, the cart 204 may have no pressure sensor, and the vehicle engine pressure sensor may be used.

For example, by pressurizing the high-pressure fuel system 202 with the fuel pressurization system 200, the sensor 212 detects data utilized to determine aspects of the vehicle fuel system that meet one or more designated criterion. As an example, a decrease within the high-pressure fuel system 202 over time may be the designated criterion. The designated criterion may also be the pressure within the interior cavity decreasing at a rate greater than a threshold amount may indicate of a leak or fuel decay within the high-pressure fuel system 202, whereas below the threshold amount may indicate a healthy or fuel system that does not need repair. In another example, ranges are provided for the pressure drop as a function of time, where a range is provided between a first threshold and second threshold that represents when repair or maintenance is recommended, but not required. Specifically, a pressure drop above the first threshold indicates immediate repair or replacement is required, and the locomotive should not leave the motive train depot before repair or replacement.

In another example, when the pressure drop falls within the range between the first threshold and the second threshold, maintenance is recommended before the locomotive leaves the motive train depot, but may not be required. Specifically, if scheduling conflicts exist, equipment for repair or replacement is not available, or the like occurs, the locomotive may go out on another route and be repaired at a different motive train depot. In one example, when a pressure drop falls between the first threshold and second threshold, a recommended distance to repair is determined by one or more processors so that the one or more processors, or an individual may compare the recommended distance to the route the locomotive is to take when leaving the motive train depot. In this manner, depending of the distance of the routes, some routes may be recommended against, and/or delayed until a repair is provided. When the pressure drop is below the second threshold, the locomotive is considered to be operating appropriately and repair or replacement is unneeded.

The sensor 212 may also be positioned within a conduit or cavity of the fuel pressurization system 200 that forms a cavity with the high-pressure fuel system 202, or may be inserted into the cavity of the high-pressure fuel system 202 when the fuel pressurization system 200 is coupled to the high-pressure fuel system 202. In yet another example, the sensor 212 is within the high-pressure fuel system 202 and the fuel pressurization system 200 includes a transponder (FIG. 3) that receives signals from the sensor 212 within the high-pressure fuel system 202. In each case pressure data is received by a controller (FIG. 3) related to the fuel pressurization system 200 for diagnostic analysis. In one example the controller is on the cart 204 and in some embodiments may be mobile, or transportable. In another example the controller is part of vehicle monitoring equipment that is remote to the cart 204, and in at least one example is a part of, or coupled to, the vehicle. Still, even when the controller is part of, or coupled to, the vehicle, the controller is considered included in the fuel pressurization system 200 in that readings, information, and data associated with the fuel pressurization system 200 are determined by the controller.

Figure 3:
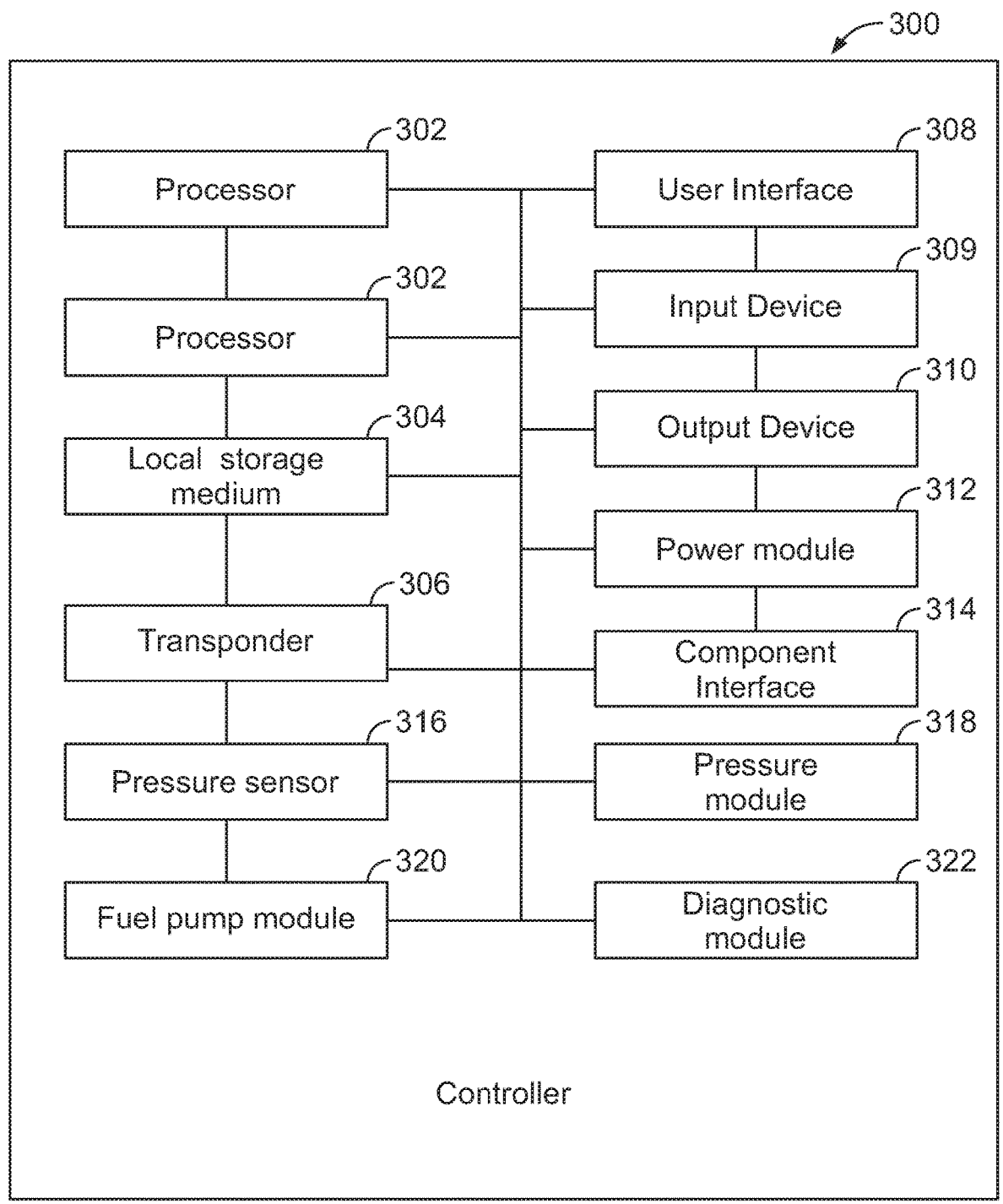
FIG. 3 illustrates a schematic view of one embodiment of a controller for a fuel pressurization system.

FIG. 3 illustrates a schematic diagram of a controller 300 of a fuel pressurization system. In one example, the controller 300 is a controller of fuel pressurization system 200 of FIG. 2. The controller includes components such as one or more processors 302 (e.g., a microprocessor, microcomputer, application-specific integrated circuit, etc.), one or more local storage medium (also referred to as a memory) 304, a transponder 306, a user interface 308 that includes one or more input devices 309 and one or more output devices 310, a power module 312, a component interface 314, and at least one pressure sensor 316. All of these components can be operatively coupled to one another, and can be in communication with one another, by way of one or more internal communication links, such as an internal bus.

The memory 304 can encompass one or more memory devices of any of a variety of forms (e.g., read only memory, random access memory, static random access memory, dynamic random access memory, etc.) and can be used by a processor 302 to store and retrieve data. The data that is stored by the memory 304 can include, but need not be limited to, operating systems, applications, user collected content and informational data. Each operating system includes executable code that controls basic functions of the device, such as interaction among the various components, communication with external devices via the transponder 306 and/or the component interface 314, and storage and retrieval of applications and data to and from the memory 304. Each application includes executable code that utilizes an operating system to provide more specific functionality for the communication devices, such as file system service and handling of protected and unprotected data stored in the memory 304.

The transponder 306 can utilize a known wireless technology for communication. Exemplary operation of the transponder 306 in conjunction with other components of the controller 300 may take a variety of forms and may include, for example, operation in which, upon reception of wireless signals, the components of controller 300 detect communication signals from secondary devices and the transponder 306 modulates the communication signals to recover incoming information, such as responses to inquiry requests, voice and/or data, transmitted by the wireless signals. A processor 302 formats outgoing information and conveys the outgoing information to one or more of the transponders 306 for modulation to communication signals. The transponder(s) 306 convey the modulated signals to a remote device, such as a cell tower or a remote server (not shown).

The input and output devices 309, 310 may each include a variety of visual, audio, and/or mechanical devices. For example, the input devices 309 can include a motion sensor or proximity sensor for detecting the position of a base relative to a display, visual input device including an optical sensor or camera, an audio input device including a microphone, and a mechanical input device including a keyboard, keypad, selection hard and/or soft buttons, switch, touchpad, touch screen, icons on a touch screen, a touch sensitive areas on a touch sensitive screen and/or any combination thereof. Similarly, the output devices 310 can include a visual output device, one or more light emitting diode indicators, an audio output device such as a speaker, alarm and/or buzzer, a mechanical output device including a vibrating mechanism, or the like. The display may be touch sensitive to various types of touches and gestures.

The pressure sensor 316 may be of any type to determine the pressure within a fuel system. The pressure sensor 316 may be within a fluid conduit, a cavity of the fuel system, or the like. The pressure sensor 316 in one example operates as a transducer that determines or detect the pressure of the fuel system and transmits signals to a remote device for analysis and processing.

A pressure module 318 may be electrically coupled to and/or in communication with the pressure sensor 316 to determine the change in pressure of a fuel system and transmit activation signals to operate the fuel pressurization system to re-pressurize the high-pressure fuel system. In one example the pressure module is implemented as circuitry that converts pressure related signals from the pressure sensor 316 to actuate the fuel pressurization system to re-pressurize the high-pressure fuel system. Alternatively, the pressure module is a software application stored in the memory 304 that calculates a change of pressure within the high-pressure fuel system after a predetermined period of time. Then, mathematically, either through use of an algorithm, operations, or the like, a determination is made regarding when to re-pressurize the high-pressure fuel system based on pressure signals transmitted from the pressure sensor 316 to the pressure module. Alternatively, the determination is made using look-up tables stored in the memory 304, or threshold values to determine when to re-pressurize the high-pressure fuel system.

A fuel pump module 320 is also electrically coupled to the pressure sensor 316 to determine the volume of fuel being supplied into the high-pressure fuel system. Based on the pressure signals received from the pressure sensor, the fuel pump module 320 transmits activation signals to operate the flow of fuel being supplied into the high-pressure fuel system. In one example the pressure module 318 and fuel pump module 320 are a single module that controls the flow of fuel into the fuel system from the fuel pressurization system. The fuel pump module 320 may control and vary the amount of fuel flowing into and being supplied by the high-pressure fuel system. In this manner the fuel pump module 320 may increase the flow rate of fuel, decrease the flow rate of fuel, start the flow of fuel, or stop the flow of fuel supplied by the fuel pressurization system to the fuel system.

In one example the fuel pump module 320 is implemented as circuitry that converts pressure related signals from the pressure sensor 316 to actuate the fuel pressurization system to activate and control the flow of fuel supplied by the high-pressure fuel system. Alternatively, the fuel pump module 320 is a software application stored in the memory 304 that calculates a change of pressure and/or fuel volume within the high-pressure fuel system after a predetermined period of time. Then, mathematically, either through use of an algorithm, operations, or the like a determination is made regarding how to vary the flow of fuel supplied by the high-pressure fuel system based on pressure signals transmitted from the pressure sensor 316 to the fuel pump module 320. Alternatively, the determination is made using look-up tables stored in the memory 304, or threshold values to determine how to vary the fuel supplied to the high-pressure fuel system.

A diagnostic module 322 may be electrically coupled to the processor(s) 302, memory 304, transponder 306, input devices 309, and pressure sensor 316 to receive input signals related to features or characteristics of interest of the high-pressure fuel system. The diagnostic module 322 may receive input signals to provide the features of interest of the high-pressure fuel system. In one example, the input signal is related to the amount of time since maintenance of the high-pressure fuel system that is stored in the memory 304. In another example the input signal is related to weather conditions during a previous route received from the transponder 306 from a remote location. In yet another example the input signal is related to a temperature sensor within the high-pressure fuel system and communications data signals related to the change of temperature with the high-pressure fuel system. In another example, the input signal may relate to the change of pressure within the high-pressure fuel system received in pressure signals transmitted by the pressure sensor 316. In each example, the diagnostic module 322 receives data signals related to a characteristic of interest of the fuel system.

The diagnostic module 322, based on the received characteristics of interest, makes determinations related to features of interest of the high-pressure fuel system and transmits these determinations for use through an output device 310. In one example the diagnostic module 322 determines a decay rate and curve of the high-pressure fuel system. In another example the feature of interest is determined by isolating an interior area of the high-pressure fuel system. In yet another example, the diagnostic module 322 determines and forms a decay profile that may indicate if a leak is at a seal, a crack, an injector, or the like. In yet another example, the diagnostic module determines changes is geometry of the high-pressure fuel system based on the characteristics of interest. These determinations, including profiles, engine maps, crack locations, decay rate, or the like may be transmitted by the diagnostic module 322 for communication on an output device 310, including on a display, in an electronic message, an auditory message, or the like to present the feature of interest to a user.

In one example the diagnostic module 322 is implemented as circuitry that converts characteristics of interests of the high-pressure fuel system received by the diagnostic module into the features of interest of the high-pressure fuel system. Alternatively, the diagnostic module 322 is a software application stored in the memory 304 that determines the features of interest of the high-pressure fuel system. This determination may be made mathematically, either through use of an algorithm, operations, or the like, or alternatively, the determination is made using look-up tables stored in the memory 304, or threshold values.

Figure 4:
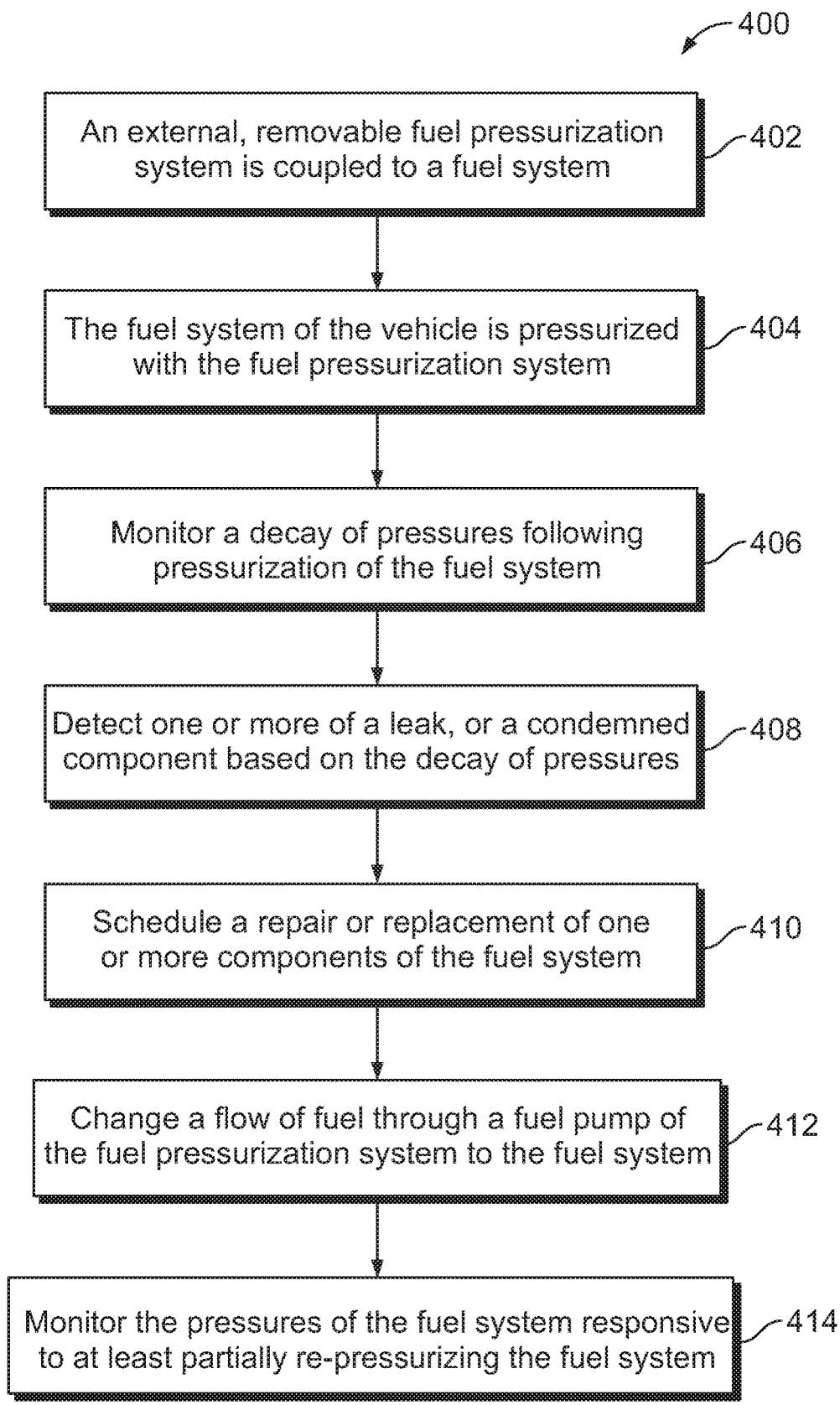
FIG. 4 illustrates a flow block diagram of one embodiment of a process for performing a diagnosis of a vehicle component.

FIG. 4 is a flow chart illustrating a process 400 for detecting one or more of a leak, or a replaceable component of a fuel system of a vehicle, based on monitored decay of pressure. In one example, the process is performed on a high-pressure fuel system of a locomotive using a fuel pressurization system in an area that has restricted airflow. In one example, the fuel system is the high-pressure fuel system 202 of FIG. 2 and the fuel pressurization system is the fuel pressurization system 200 of FIG. 2.

At 402, an external, removable fuel pressurization system is coupled to a fuel system of a vehicle while the vehicle remains in area with restricted air flow, that in one example is a motive power depot. In one example the vehicle is a locomotive and is within the motive power depot after completing a route. The locomotive may be in the motive power depot awaiting to start a new route, stopped for a predetermined amount of time before a next route, stopped for maintenance and/or repair, or the like. The motive power depot may be any type of structure that may house the vehicle and accommodate a fuel pressurization system. In one example, coupling the fuel pressurization system to the fuel system of the vehicle includes moving the fuel pressurization system to the vehicle in the motive power depot. Specifically, in an example, the removeable fuel pressurization system is portable, including of size and shape to be carried from to different locations within and outside of the motive power depot. In one example the fuel pressurization system includes a cart, or wheels that facilitate movement of the fuel pressurization system within the motive power depot.

At 404, the fuel system of the vehicle is pressurized with the fuel pressurization system without activating an engine of the vehicle. In one example, when the vehicle is a locomotive, the locomotive, and consequently the engine of the locomotive, is not operating. In this manner, the diagnostic test of the engine may be performed within an area that would otherwise be precluded. Because the vehicle engine is not operating, engine cooling, or other functions of the locomotive that may result if variance in pressure readings may be deactivated during pressure sensing, and may not interfere with determinations. Specifically, only the fuel pressurization system pressurizes the engine and the engine itself may be deactivated or turned off. As a result, the pressurization may be varied and controlled to provide favorable conditions for the pressure sensor or other input devices to receive accurate readings associated with the fuel system. This minimizes determinations of false or inaccurate results that lead to unneeded repairs that waste time, effort, and cost.

In another example, the fuel system of the vehicle is pressurized with the fuel pressurization system while the vehicle remains in the motive power depot. In particular, by determining if repairs are needed for a fuel system within the motive power depot using the movable fuel pressurization system, the repairs may be made during a downtime of the vehicle. Thus, instead of starting up the vehicle and discovering the needed repair after the vehicle is outside of the motive power depot, the repair is done before start-up. This prevents the waste of time to bring the vehicle back into the motive power depot, and the delay in logistics caused by a vehicle that needs to leave on a route having to be repaired. In one example, the fuel system of the vehicle is pressurized by fluidly coupling a pump of the fuel pressurization system to the fuel system, wherein the pump of the fuel pressurization system is driven by an engine of the fuel pressurization system.

At 406, one or more processors monitor a decay of pressure of the fuel system following pressurization of the fuel system. In one example, a pressure sensor detects the change in pressure over time of a high-pressure fuel system of a locomotive. By monitoring the decay of pressure, characteristics of interest of the fuel system are determined that may be used by a diagnostic module. In one example, the decay of pressure of the fuel system is monitored to determine a decay rate. In one example, the decay of pressure of the fuel system is monitored to determine a waveform relating to the decay of pressure. These measurements and determinations may be provided using an algorithm, graph, or the like based on the monitored pressures of the fuel system. The waveform that is determined may be compared against a list or table of historical waveforms. The waveforms in the list may be associated with various components or failure modes. That is, a leak at a gasket may produce one distinct waveform, but a crack in a fuel line may produce another waveform. Similarly, waveforms may be associated with individual cylinders in the engine. Matching the waveform to the firing pattern of the cylinders may allow a particular cylinder, injector, piston, or valve to be identified as perturbing the waveform. Diagnosing which component needs to be repaired or replaced can be accomplished based at least in part with waveform analysis. In yet another example, an individual observes the fuel system and provides an input into the one or more processors of a leak condition.

At 408, one or more processors detect a leak of the fuel system of the vehicle based at least in part on the decay of pressure that is monitored. Further, it may indicate one or more components that should be repaired or replaced (i.e., replaceable components), or that workmanship failures of scheduled and/or unscheduled maintenance is present. In one example, the decay of pressure may be used by a diagnostic module that determines that a leak or replaceable component is present as a result of a change in pressure over a predetermined time, or interval, is more than a threshold drop in pressure over that predetermined time. In another example, the diagnostic module includes an algorithm that based on the monitored change in pressure over a predetermined time, or interval, detects the leak or replaceable component is present. In yet another example, one or more processors include a look-up table and a detected pressure drop over a predetermined time, or interval, to detect an improperly reassembled system from recent maintenance is present.

At 410, one or more processors schedules a repair or replacement of one or more components of the fuel system responsive to detecting the one or more of the leak, or replaceable component, of the fuel system. In one example, the vehicle is a locomotive within a motive power depot and the repair or replacement occurs before the locomotive leaves the motive power depot and travels along one or more routes to another location. In this manner, the repair or replacement occurs without the locomotive leaving the motive depot and the locomotive operating with a faulty fuel system that reduces efficiencies, causes additional damage to fuel system or rest of the engine, results in the locomotive breaking down mid-route, or the like. This repair and replacement may reduce engine wear, reduce down-time, reduce costs, and the like. In one example, the one or more processors communicate with a remote device to schedule the repair or replacement. The remote device includes a computing device at the motive power depot that includes a memory with a database related to replacement and repair schedules for locomotives within, or associated with, the motive power depot, and mechanics or individuals that provide repairs and/or replacements. The one or more processors may communicate wirelessly with the remote device, through a hardwire, or the like.

At 412, one or more processors, in response to detecting one or more of a decay rate of interest, or a decay waveform of interest, in the pressures of the fuel system, changes a flow of fuel through fuel pumps of the fuel pressurization system to the fuel system. In one example, the one or more processors at least partially re-pressurize the fuel system of the vehicle using the fuel pressurization system. The one or more processors automatically actuate the engine of the fuel pressurization system to have the fuel pumps provide additional high-pressure fuel within the fuel system. Optionally, in another example, the one or more processors selectively change the flow of fuel through the fuel pumps of the fuel system of the vehicle by selectively activating one or more of the fuel pumps responsive to pressurizing the fuel system using the fuel pressurization system. The replaceable component of the fuel system is then detected as at least one of the fuel pumps based on the decay of pressure that are monitored. In this manner, the one or more processors pinpoint the component, in this example the fuel pumps, that is in need of repair or replacement.

At 414, the one or more processors monitor the pressures of the fuel system responsive to at least partially re-pressurizing the fuel system. The one or more of the leak, or the replaceable component, of the fuel system of the vehicle may then be detected based at least in part on the pressures of the fuel system that are monitored responsive to at least partially re-pressurizing the fuel system.

Provided are systems and methods for diagnosing leak and/or fuel decay damage within a high-pressure fuel system using a removable fuel pressurization system, and repairing or replacing a component accordingly. The removable high-pressure fuel system includes at least one fuel pump that couples to a fuel system of a vehicle and can deliver high-pressure fuel to the fuel system. The fuel pressurization system also includes sensors to detect leaks, fuel decay, or the like within the fuel system. Based on detecting the leaks, or fuel decay, the fuel pressurization system may vary the flow of fuel into the fuel system, including to re-pressurize the fuel system to verify determination related to the leaks and/or fuel decay to improve accuracy of determinations. Because the removable fuel pressurization system is mobile, the determination a repair or replacement is needed may take place within a train depot before the locomotive exits the depot for starting. By making this determination within the train depot, the locomotive vehicle does not have to be brought back into the depot for repair, avoiding undesired logistics, downtime, labor, costs, and the like.

In accordance with certain embodiments discussed herein a method is provided that includes coupling an external, removable fuel pressurization system to a fuel system of a vehicle while the vehicle remains in a motive power depot, and pressurizing the fuel system of the vehicle with the fuel pressurization system while the vehicle remains in the motive power depot and without activating an engine of the vehicle. A decay of pressure of the fuel system is monitored following pressurization of the fuel system, one or more of a leak or a replaceable component of the fuel system of the vehicle are detected based on the decay of pressure that are monitored.

Optionally, one or more components of the fuel system of the vehicle are repaired or replaced responsive to detecting the one or more of the leak or the presence of a replaceable component of the fuel system before the vehicle leaves the motive power depot and travels along one or more routes to another location. Alternatively, coupling the fuel pressurization system to the fuel system of the vehicle includes moving the fuel pressurization system to the vehicle in the motive power depot.

In one aspect, the fuel system of the vehicle is pressurized by fluidly coupling a pump of the fuel pressurization system to the fuel system, and the pump of the fuel pressurization system is driven by an engine of the fuel pressurization system. In another aspect, the fuel system is pressurized also without activating a cooling system of the vehicle. In yet another aspect, the decay of pressure of the fuel system is monitored to determine a decay rate or a waveform.

Optionally, the fuel system of the vehicle is at least partially re-pressurized using the fuel pressurization system responsive to detecting one or more of a decay rate of interest or a decay waveform of interest in the pressures of the fuel system, and the pressures of the fuel system are monitored responsive to at least partially re-pressurizing the fuel system. The one or more of the leak or presence of the replaceable component of the fuel system of the vehicle is detected based at least in part on the pressures of the fuel system that are monitored responsive to at least partially re-pressurizing the fuel system. In another aspect a flow of fuel is selectively changed through fuel pumps of the fuel system of the vehicle by selectively activating one or more of the fuel pumps responsive to pressurizing the fuel system using the fuel pressurization system. The replaceable component of the fuel system is detected as at least one of the fuel pumps based on the decay of pressure that are monitored.

In one embodiment, the diagnostic system's fuel pumps may selectively pump fuel system cleaner or another fluid through the fuel system. The fluid may be fuel, but with cleaning additives. This may allow the fuel system to loop back into fuel storage unit and by which cycling the cleaning fluid fuel flow may be useful to reduce deposits in the fuel system's components.

While embodiments of the invention may have shown relative to a locomotive as an example vehicle, suitable vehicles may include passenger cars, on-road trucks, buses, off road vehicles, aircraft, mining equipment, and marine vessels. Fleet vehicles are suited for use with embodiments of the invention. Mining equipment may operate in the confines of a mine. Aircraft may be located in hangers, in which it may be undesirable to turn on the engines. Pressurized fuel systems may be present as stationary or semi-permanent power generators. Such generators may be somewhat permanently housed within a structure that is plumbed for exhaust gas, but which may need partial disassembly to maintain (at which point the ventilation or sound proofing may not be installed). To the extent that such is the case, these power generators (fixed or mobile) may be counted as vehicles for purposes of using embodiments of the invention.

In accordance with certain embodiments discussed herein, a mobile fuel pressurization system is provided that includes a mobile cart, a pump engine disposed on the mobile cart, and one or more fuel pumps disposed on the mobile cart, the one or more fuel pumps coupled with and powered by the pump engine. Also included is a controller disposed on the mobile cart and configured to communicate with one or more pressure sensors operably coupled with a fuel system of a vehicle. The mobile cart is configured to be moved into a motive power depot where the vehicle is located, the one or more fuel pumps on the mobile cart are configured to be fluidly coupled with the fuel system of the vehicle, and the pump engine is configured to be activated to power the one or more fuel pumps on the mobile cart to pressurize the fuel system of the vehicle while the vehicle remains in the motive power depot and without activating an engine of the vehicle. The controller is configured to receive pressure measurements provided by the one or more pressure sensors to monitor decay of pressure of the fuel system following pressurization of the fuel system, the controller configured to detect one or more of a leak or a replaceable component of the fuel system of the vehicle based on the decay of pressure that are monitored.

Optionally, the controller is configured to output instructions to one or more of repair or replace one or more components of the fuel system of the vehicle responsive to detecting the one or more of the leak or the replaceable component of the fuel system before the vehicle leaves the motive power depot and travels along one or more routes to another location. In another aspect, coupling the fuel pressurization system to the fuel system of the vehicle includes moving the fuel pressurization system to the vehicle in the motive power depot. In yet another aspect, the one or more fuel pumps are configured to pressurize the fuel system without activating a cooling system of the vehicle. In one aspect, the controller is configured to monitor the decay of pressure of the fuel system by determining one or more of a decay rate or a waveform of the decay of pressure.

Optionally, the controller also is configured to control operation of the one or more fuel pumps to at least partially re-pressurize the fuel system of the vehicle responsive to detecting one or more of a decay rate of interest or a decay waveform of interest in the pressures of the fuel system.

Alternatively, the controller also is configured to monitor the pressures of the fuel system responsive to at least partially re-pressurizing the fuel system, the controller configured to detect the one or more of the leak or the replaceable component based at least in part on the pressures of the fuel system that are monitored responsive to at least partially re-pressurizing the fuel system.

In another aspect, the controller also is configured to be operably coupled with fuel pumps of the fuel system of the vehicle, the controller configured to selectively activate one or more of the fuel pumps responsive to pressurizing the fuel system, the controller configured to detect the replaceable component of the fuel system as at least one of the fuel pumps based on the decay of pressure that are monitored.

In accordance with certain embodiments discussed herein, a method is provided that includes coupling an external, mobile fuel pressurization system to a vehicle fuel system, and pressurizing the vehicle fuel system with one or more pumps powered by an engine of the mobile fuel pressurization system while an engine and a cooling system of a vehicle containing the vehicle fuel system remain deactivated. Pressures of the fuel system are measured from pressurization of the fuel system, and one or more determined aspects of the vehicle fuel system meet one or more designated criterion are detected based on a change in the pressures of the fuel system following pressurization of the fuel system.

Optionally, coupling the fuel pressurization system to the vehicle fuel system includes moving the fuel pressurization system to the vehicle in a motive power depot while the vehicle remains stationary. In another aspect, the one or more determined aspects of the vehicle fuel system meet one or more designated criterion are detected based on one or more of a decay rate of the pressures of the vehicle fuel system or a waveform of the pressures of the vehicle fuel system.

Optionally, the vehicle fuel system is at least partially re-pressurizing using the fuel pressurization system responsive to detecting the one or more determined aspects of the vehicle fuel system meet one or more designated criterion, and the pressures of the fuel system are monitored responsive to at least partially re-pressurizing the fuel system. One or more of a leak or a replaceable component of the vehicle fuel system is detected based at least in part on the pressures of the vehicle fuel system that are monitored responsive to at least partially re-pressurizing the fuel system.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   coupling an external, removable fuel pressurization system to a fuel system of a vehicle while the vehicle remains in a confined space;
   pressurizing the fuel system of the vehicle with the fuel pressurization system while the vehicle remains in the confined space and without activating an engine of the vehicle;
   monitoring a decay of pressure of the fuel system following pressurization of the fuel system; and
   detecting one or more of a leak or a replaceable component of the fuel system of the vehicle based at least in part on the decay of pressure that are monitored.

2. The method of claim 1, further comprising repairing or replacing one or more components of the fuel system of the vehicle responsive to detecting the one or more of the leak or the replaceable component of the fuel system before the vehicle leaves the confined space and travels along one or more routes to another location.

3. The method of claim 1, wherein coupling the fuel pressurization system to the fuel system of the vehicle includes moving the fuel pressurization system to the vehicle in the confined space.

4. The method of claim 1, wherein the fuel system of the vehicle is pressurized by fluidly coupling a pump of the fuel pressurization system to the fuel system, wherein the pump of the fuel pressurization system is driven by an engine of the fuel pressurization system.

5. The method of claim 1, wherein the fuel system is pressurized also without activating a cooling system of the vehicle.

6. The method of claim 1, wherein the decay of pressure of the fuel system is monitored by measuring one or more of a decay rate or a waveform of the decay of pressure.

7. The method of claim 1, further comprising:
at least partially re-pressurizing the fuel system of the vehicle using the fuel pressurization system responsive to detecting one or more of a decay rate of interest or a decay waveform of interest in the pressures of the fuel system; and
monitoring the pressures of the fuel system responsive to at least partially re-pressurizing the fuel system,
wherein the one or more of the leak or the replaceable component of the fuel system of the vehicle is detected based at least in part on the pressures of the fuel system that are monitored responsive to at least partially re-pressurizing the fuel system.

8. The method of claim 1, further comprising:
selectively changing a flow of fuel through fuel pumps of the fuel system of the vehicle by selectively activating one or more of the fuel pumps responsive to pressurizing the fuel system using the fuel pressurization system,
wherein the replaceable component of the fuel system is detected as at least one of the fuel pumps based on the decay of pressure that are monitored.

9. A method comprising:
coupling an external, mobile fuel pressurization system to a vehicle fuel system;
pressurizing the vehicle fuel system with one or more pumps of the mobile fuel pressurization system while an engine and a cooling system of a vehicle containing the vehicle fuel system remain deactivated;
measuring pressures of the fuel system from pressurization of the vehicle fuel system; and
detecting one or more determined aspects of the vehicle fuel system meet one or more designated criterion based on a change in the pressures of the vehicle fuel system following pressurization of the vehicle fuel system.

10. The method of claim 9, wherein coupling the fuel pressurization system to the vehicle fuel system includes moving the fuel pressurization system to the vehicle in a motive power depot while the vehicle remains stationary.

11. The method of claim 9, wherein the one or more determined aspects of the vehicle fuel system meet one or more designated criterion are detected based on one or more of a decay rate of the pressures of the vehicle fuel system or a waveform of the pressures of the vehicle fuel system.

12. The method of claim 9, further comprising:
at least partially re-pressurizing the vehicle fuel system using the fuel pressurization system responsive to detecting the one or more determined aspects of the vehicle fuel system meet one or more designated criterion;
monitoring the pressures of the fuel system responsive to at least partially re-pressurizing the vehicle fuel system; and
detecting one or more of a leak or a replaceable component of the vehicle fuel system based at least in part on the pressures of the vehicle fuel system that are monitored responsive to at least partially re-pressurizing the vehicle fuel system.

* * * * *